United States Patent
Niino et al.

(10) Patent No.: US 6,797,305 B2
(45) Date of Patent: Sep. 28, 2004

(54) MANUFACTURING PROCESS OF TEA BEVERAGES

(75) Inventors: Hitoshi Niino, Shizuoka (JP); Hitoshi Kinugasa, Shizuoka (JP); Masami Sasame, Shizuoka (JP); Kazunori Okanoya, Shizuoka (JP); Shuhei Kuribayashi, Shizuoka (JP); Kenji Shimaoka, Shizuoka (JP); Yoko Ueno, Shizuoka (JP)

(73) Assignee: Ito En, Ltd., Tokyo (JP)

( * ) Notice: Subject to any disclaimer, the term of this patent is extended or adjusted under 35 U.S.C. 154(b) by 0 days.

(21) Appl. No.: 10/368,641

(22) Filed: Feb. 20, 2003

(65) Prior Publication Data

US 2003/0185950 A1 Oct. 2, 2003

(30) Foreign Application Priority Data

Feb. 20, 2002 (JP) .................................. P2002-043974

(51) Int. Cl.[7] .............................. A23F 3/16; A23L 1/28
(52) U.S. Cl. ..................... 426/435; 426/597; 426/495; 426/655; 426/490
(58) Field of Search ..................... 426/597, 495, 426/655, 490, 435

(56) References Cited

U.S. PATENT DOCUMENTS

| | | | |
|---|---|---|---|
| 4,051,267 A | 9/1977 | Jongeling | |
| 6,491,943 B2 * | 12/2002 | Tsuji et al. | 424/439 |
| 6,638,524 B2 * | 10/2003 | Tsuji et al. | 424/439 |

FOREIGN PATENT DOCUMENTS

| | | |
|---|---|---|
| JP | 63-36745 A | 2/1988 |
| JP | 4-45744 A | 2/1992 |
| JP | 4-311348 A | 11/1992 |
| JP | 6-269246 A | 9/1994 |
| JP | 6-311847 A | 11/1994 |
| JP | 8-228684 A | 9/1996 |
| JP | 10-165096 A | 6/1998 |
| JP | 11-56241 A | 3/1999 |
| JP | 2001-45973 A | 2/2001 |

OTHER PUBLICATIONS

Hirofumi Tachibana, "Suppress the Cause of Allergy", Food & Health, Chunichi Newspapers, Jul. 8, 2001.

Takuo Okuda, et al., "Casuariin, Stachyurin and Strictinin, New Ellagitannins from *Casuarina stricta* and *Stachyurus praecox*", Chem. Pharm. Bull., 30(2), pp. 766–769, 1982.

Takuo Okuda, et al., "Tannins of Casuarina and Stachyurus Species. Part 1. Structures of Pendunculagin, Casuarictin, Strictinin, Casuarinin, Casuariin and Stachyurin", J. Chem. Soc. Perkin Trans. 1, No. 8, pp. 1765–1772, 1983.

* cited by examiner

*Primary Examiner*—Anthony Weier
(74) *Attorney, Agent, or Firm*—Sughrue Mion, PLLC

(57) ABSTRACT

Providing a manufacturing process of tea beverages that the secondary sediment does not occur even during the long-term storage.

In the manufacturing process, determining the strictinin content in a tea extract or formulation of before-heat-sterilization, to manage to manufacture the strictinin content to be at or below the predetermined level. Since the strictinin in the tea extract or formulation decomposed to ellagic acid which is a cause substance of the secondary sediment after heat-sterilization, the occurrence of secondary sediment can be prevented previously by managing the manufacturing process to control the strictinin content in the tea extract or formulation of before-heat-sterilization.

18 Claims, 5 Drawing Sheets

The meshed are the fraction formed sediment in the Sediment Forming Test (Test 1).

The meshed are the fraction formed sediment in the Sediment Forming Test (Test 1).

Changes of Strictinin Aqueous Solution After Heat Sterilization (A) Before Heat Sterilization P3: 9.1 ppm    EA: Trace
P3: Strictinin    EA: Ellagic Acid (B) After Heat Sterilization P3: Trace    EA: Trace
P3: Strictinin    EA: Ellagic Acid Changes of Strictinin + HP-20 Unadosrbed-fraction After Heat Sterilization

MANUFACTURING PROCESS OF TEA BEVERAGES

BACKGROUND OF THE INVENTION

1. Field of the Invention

The present invention relates to a process for manufacturing tea beverages, suitable for the tea beverages filled in containers that sediments do not occur even during the long-term storage. It particularly relates to a process that can prevent from the occurrence of secondary sediment predicting the occurrence of the secondary sediment.

2. Related Art Statement

In these days, green tea beverages tightly filled in cans or plastic bottles have been continuously developed. During the storage, green tea beverages have something flocky, floating, or white turbidly suspended matter, or precipitate, that is, "sediment" occurs, and this is a problem for the beverages. When such sediment occurs, especially, in the case of green tea beverages filled in clear bottles, the marketability will be lost due visual impressions.

The said sediment can be classified into "primary sediment" and "secondary," where the primary sediment occurs immediately after the production of tea beverages, while the secondary sediment occurs gradually with time during the storage of the products. The primary sediment obviously occurs where caffeine bind with tannin or protein. It has been confirmed, as a preventing method, that the occurrence of the primary sediment can be surely prevented by kieselguhr filtration or membrane filtration after centrifugal separation of a tea extract.

Although there are various views for the secondary sediment, there has been no established view on the occurring mechanisms. As one of the main views, the following has been known that "when green tea leaves are extracted, the extract contains a high concentration of flavonol in the un-oxidized state at first. The flavonol, particularly, a catechin component, is gradually oxidized with metal ions, such as calcium, magnesium, aluminum, zinc or iron, and dissolved oxygen in the extract to become macromolecular polyphenol. Such oxidized polyphenol gradually binds with caffeine, proteins, pectin or polysaccharides by the catalytic action of metal ions to form complexes. As the complexes are formed, green tea beverage turns the color from clear light green to brown, the suspended matter gradually begins to occur, and then, the visible flock secondary sediment is formed."

The conventional manufacturing processes of tea beverages to prevent the occurrence of secondary sediment are mainly the following 4 methods:

a) Removing the cause substances of the sediment by filtration, such as ultrafiltration, microfiltration or kieselguhr filtration;

b) In the process a), before the filtration, adding ascorbic acid and sodium bicarbonate, or actively precipitate the cause substances of the sediment by rapid cooling, followed by filtration;

c) Adding chemicals or enzyme reagents to solubilize or stabilize the insoluble complexes; and d) Adsorbing and removing metal ions in a tea extract by ion exchange treatment.

As the method a), for example, Japanese unexamined patent publication No. 63-036745 discloses a treatment of a tea extract by adjusting a tea extract at 5–15° C. with an ultrafiltration membrane (molecular weight of 10,000–100,000), and removing the tea cream. Also, Japanese unexamined patent publication No. 04-045744 discloses a manufacturing process of clear green tea beverages by fractionating water-soluble tea components obtained by extracting green tea leaves, fresh or dry tea leaves by ultrafiltration, and removing macromolecular components having a molecular weight of 10,000 or more.

As the method b), for example, Japanese examined patent publication No. 07-097965 discloses a method to clarify beverages by adding ascorbic acid to a green tea extract to acidify, cooling rapidly, centrifuging, and then, filtrating with kieselguhr. Japanese unexamined patent publication No. 06-269246 discloses a method to clarify beverages by extracting a green tea with warm water, cooling the obtained extract, adding tannic acid to the extract, standing still, removing fine tea particulates by centrifuging, and then, filtrating with kieselguhr. Japanese unexamined patent publication No. 11-056241 discloses a manufacturing process of tea beverages by adding sodium ascorbate to a extract obtained by extracting tea leaves, followed by cross-flow system with microfiltration membranes. Japanese unexamined patent publication No. 06-311847 discloses a method for preventing from the precipitation of the sediment by adding chitosan to a water-soluble component of green tea, adsorbing macromolecular polyphenol, adsorbing and recovering the adsorbed chitosan and the residual chitosan with kieselguhr.

As the method c), for example, Japanese unexamined patent publication No. 08-228684 discloses a method to effectively inhibit the occurrence of secondary sediment of green tea beverages, by centrifuging or cloth-filtering the warm-water extract of green tea, further combining with a process adding an enzyme having a hemi-cellulose activity. Japanese unexamined patent publication No. 2001-045973 discloses a method to inhibit the occurrence of flock in beverages, by adding $\alpha$-amylase to a green tea extract. Also, U.S. Pat. No. 4,501,261 (Jongeling) can be referred to as the method c).

As the method d), Japanese Patent No. 3,152,416 discloses a method for producing tea, by treating with a cation exchange resin having a sulfonic acid group previously bonded with potassium ion.

The main methods among the conventional manufacturing process of tea beverages have been tried and tested. Although all the methods have their own effects, many of the methods highly depend on the raw materials used. When the beverage concentration is increased more than those of the examples, in the balance with the flavor, there have been the cases that the secondary sediment occurred.

In order to test whether the secondary sediment occurs in produced tea beverages, generally, store the products at room temperature or under the warming condition for a long term, such as, for about 6 months, and continuously observe the occurrence. Once the occurrence of the secondary sediment is observed, a great deal of labor and time have been required since the reselection of the raw materials and respecification of the production condition have to be determined to retest.

SUMMARY OF THE INVENTION

The studies on the causes of the secondary sediment forms during the long-term storage of green tea beverages are carried out. From the studies, the inventors found that "strictinin" in a tea extract or formulation is one of the cause substances for the occurrence of secondary sediment. The strictinin is decomposed to ellagic acid during a process of heat-sterilization, and the said ellagic acid binds with protein to form the secondary sediment. The present invention is characterized in that the manufacturing process of tea beverages carrying out with a process determining the strictinin content in a tea extract or formulation during the process.

The strictinin is a compound (1-O-galloyl-4,6-O-(S)-hexahydroxydiphenoyl-β-D-glucose) shown by the following chemical formula 1, and is one of tannins, particularly, ellagitannins extracted from tea. ("Casuariin, Stachyurin and Strictinin, New Ellagitannins from Casuarina Stricta and Stachyurus Praecox", Chem. Pharm. Bull. 30 (2) pp. 766–769, 1982).

[Chemical Formula 1]

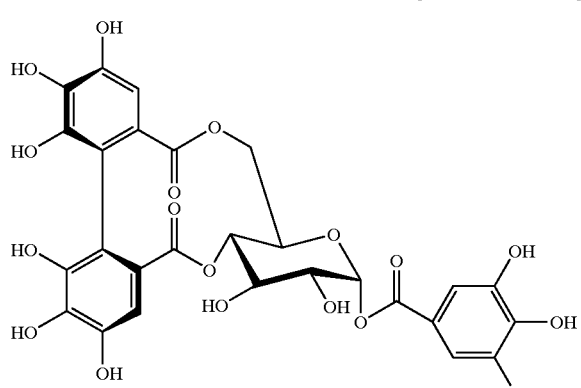

DETAILED DESCRIPTION OF THE INVENTION

Figure 1:
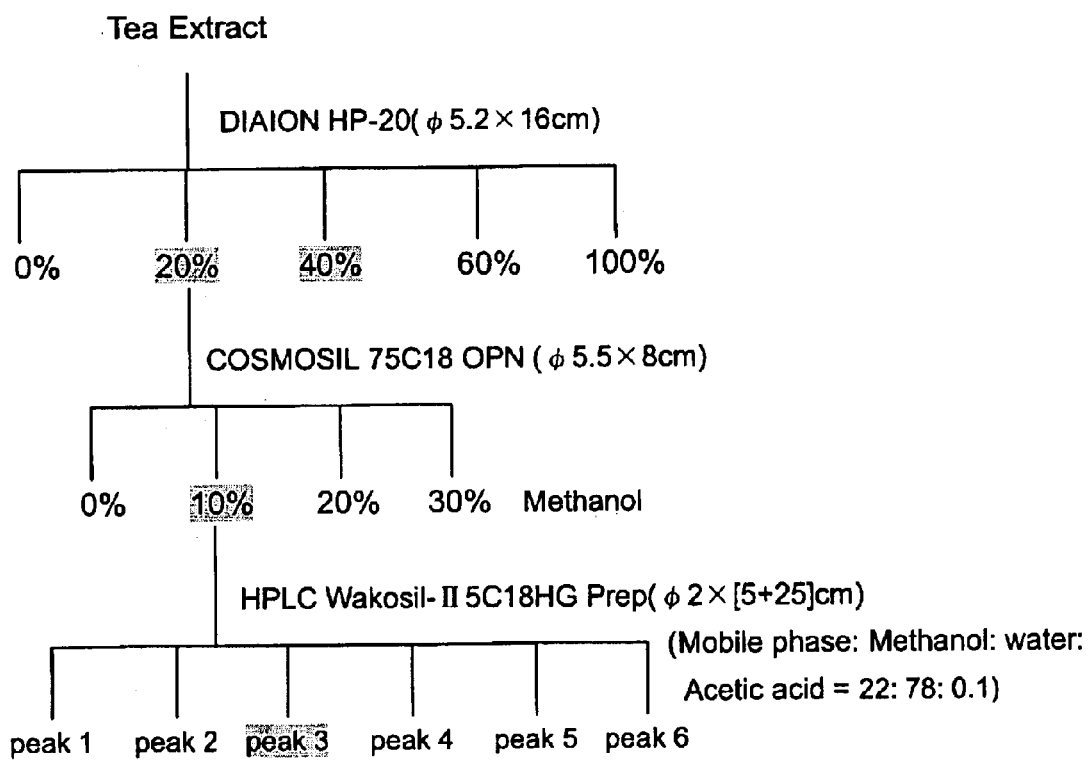
FIG. 1 is a schematic chart of a working procedure of Test 2.

The present invention provides a process for manufacturing tea beverages, including a process determining the strictinin content in a tea extract or formulation.

One of the examples for the manufacturing process of tea beverages is: determining the strictinin content of a tea extract or formulation, and specifying the strictinin content as an indicator to design a manufacturing process (planning) or to manage manufacturing conditions.

The specific methods for the design on the manufacturing process or the management on the manufacturing conditions, with the strictinin content as an indicator, are described as below:

1) Determining the strictinin content in a tea extract or formulation before treating it with heat-sterilization, where the strictinin content to be at or below the predetermined level as an indicator by carrying out one process or more selecting from selecting raw tea leaves, specifying conditions of extraction, filtration, or formulation, or specifying formulating materials and their ratios, and carrying out the heat-sterilization process for the tea extract or formulation containing a strictinin at or below the predetermined level; or, 2) Determining the strictinin content of a tea extract or formulation before treating it with heat-sterilization, where the strictinin content to be at or below the predetermined level as an indicator by treating the above-obtained tea extract or formulation, and carrying out the heat-sterilization process for the tea extract or formulation containing a strictinin at or below the predetermined level.

The actual procedures for the design of manufacturing process or the manufacturing management are not necessary restricted to the above-mentioned 1) and 2).

As the "strictinin content as an indicator", in the case of light-fermented tea, it is preferable to determine the strictinin content in a tea extract or formulation about 14 ppm or less, more desirably, about 13 ppm or less, or to determine the strictinin content in the tea solid portion of the tea extract or formulation about 0.5–1.1% or less, more preferably, about 0.6–0.8% or less.

In the case of non-fermented tea, it is preferable to determine the strictinin content in a tea extract or formulation about 6 ppm or less, more preferably, about 5 ppm or less, or to determine the strictinin content in the tea solid portion of the tea extract or formulation about 0.2–0.5% or less, more preferably, about 0.2–0.4% or less.

The tea solid portion of a tea extract or formulation is the solid components (except for water) derived from tea, such as tannin, catechin and strictinin contained in leaves or stems of plant tea (*Camellia sinensis*), but excluding the solid portion formed when ascorbic acid or sodium bicarbonate is added during the manufacturing process. The amount of tea solid portion is the amount of tea solid components.

The manufacturing process of tea beverages in the present invention provides clear tea beverages without the secondary sediment occurrence even if they are stored for a long-term period. In other words, the present invention provides the tea beverages suitable for filling in containers, such as cans, plastic bottles (including polyethylene terephthalate (PET) bottles), glass bottles and paper containers.

Moreover, in the present invention, the occurrence of the secondary sediment during the storage of tea beverages can be exactly predicted by only determining the strictinin content in a tea extract or formulation of before-heat-sterilization. Further, designing the manufacturing process or managing the conditions only with the strictinin in the tea extract or formulation as an indicator can prevent the occurrence of the secondary sediment. For example, when the raw tea leaves having a low strictinin content is used, where the strictinin content in the tea extract or formulation of before-heat-sterilization is at or below the predetermined level, it is unnecessary to control and treat for the prevention of the secondary sediment occurrence in all the processes, such as extraction, filtration and formulation, of a production line. On the other hand, where the raw tea leaves having relatively high strictinin content is used, it is only necessary to design and determine the conditions of all the processes just with the strictinin content as an indicator in the tea extract or formulation. Therefore, the indicators in the manufacturing management are simple and clear, resulting in the reduced labor significantly in the manufacturing management to prevent the occurrence of the secondary sediment in the present invention as compared with the conventional processes.

The conventional manufacturing processes of tea beverages preventing the occurrence of secondary sediment, especially, many of those removing the cause substances of the secondary sediment from a tea extract or formulation are the methods removing the substances binding with ellagic acid formed by the decomposition of strictinin. Such substances, like protein, contain substances affect the flavor and pharmacological components in tea beverages, so the originally contained flavor and pharmacological components in a tea must have been lost. On the other hand, in the present invention, the originally contained flavor and pharmacological components in tea leaves can be maintained in tea beverages by only reducing the strictinin content, since the substances, such as protein, binding with ellagic acid can be remained much more in tea beverages.

"Tea" in the present invention is the tea as a raw material, including leaves and stems, used for manufacturing tea beverages, and also, including any of fresh, crude and refined tea leaves.

"Secondary sediment" in the present invention is a flock (flocculent) suspended matter or sediment, but excluding fine powder sediment, and it should be distinguished from the "primary sediment".

DESCRIPTION OF THE PREFERRED EMBODIMENT

The preferred embodiments of the present invention are described hereafter.

The manufacturing process of tea beverages in the present invention can be carried out during the conventional process, either by adjusting the strictinin content of a tea extract or formulation, before treating it with heat-sterilization, of about 6 ppm or less, more preferably, about 5 ppm or less; or by adjusting the strictinin content of the tea solid portion of the tea extract or formulation of before-heat-sterilization about 0.2–0.5% or less, more preferably, about 0.2–0.4% or less. The process can be also carried out with the ratio, as an indicator, of the tannin or amino acid content and the strictinin content in a tea extract and formulation. The above-mentioned conventional process in this case is, for example, a manufacturing process of green tea beverages having a series of: an extraction process extracting raw tea leaves, a filtration process filtrating the extract, a formulation process adjusting the concentration of the extract and the pH, and a sterilization process sterilizing the formulation. The manufacturing process of tea beverages in the present invention is not necessarily restricted to the above-embodiment only.

Furthermore, it is preferable to determine the strictinin content in a tea extract or formulation of before-heat-sterilization, and in order to adjust the strictinin content at or below the above-mentioned predetermined level, design the manufacturing process on: selecting raw tea leaves; specifying the process of the raw tea leaves; specifying the conditions of extraction, filtration or formulation; specifying the formulation materials and their formulating ratios; and specifying the process of the tea extract or formulation. Once the production line starts operating, it is required to determine and adjust the strictinin content in the tea extract or formulation before-heat-sterilization to keep the strictinin content at or below the predetermined level by controlling the manufacturing process. The design and management of the process in the present invention is not restricted only to the above embodiment.

In the above processes, the determination of the strictinin content in the tea extract or formulation is possibly carried out at any time before heat-sterilization, but more preferably, carried out at just before the heat-sterilization.

The manufacturing process of tea beverages in the above-mentioned embodiment is described hereafter. This embodiment is just an example, so that it is possible to change the order, eliminate, or add a process in the present invention.

As the "raw tea leaves", any kind of tea is applicable if the leaves or stems are plucked from the tea plant, *Camellia sinensis* (botanic name), and as long as they are *Camellia sinensis*, it is not also a matter of question as for their varieties, products area, plucking period and means, and cultivating methods. Fresh tea, including leaves and stems, is also applicable as a raw material. Further, any kind of non-fermented tea with the crude tea process stopping the ferment activity by steaming or roasting the fresh tea leaves is applicable as the raw tea leaves, such as Sen-cha, Kamairi-cha, Kabuse-cha, Gyokuro, Ten-cha, Matcha, Ban-cha, Houji-cha, Steamed tamaryoku-cha and Pan-fired tamaryoku-cha. For the non-fermented tea, more than two of them may be mixed together, and flavors may be added to them. In addition, a light-fermented tea, such as Jasmine tea, is applicable as a raw material.

In the present invention, however, the semi-fermented tea (like Oolong tea), the fermented tea (like Black tea), and the post-heating fermented tea (like Pu-erh tea) are not preferable as the raw materials. It is because the cream-down appearing in, for example, Oolong tea and black tea is derived from other causes, which differ from the irreversible flock secondary sediment in the non-fermented tea of, for example, green tea.

In the case that a light-fermented tea, like Jasmine tea, is used, where the strictinin content is adjusted to the above-mentioned predetermined level, other manufacturing conditions can be controlled in the same way as those of non-fermented tea.

For the raw materials for the beverages, the inventors found that the differences in the varieties, products area, plucking time and means, and cultivating methods of raw tea leaves result in the differences in the strictinin contents in tea leaves, as well. Therefore, when the strictinin content in a tea extract or formulation before the process of heat-sterilization exceeds the predetermined level, the strictinin content of the said tea extract or formulation can be adjusted below the predetermined level by selecting the raw tea leaves having a low strictinin content.

In other words, it is to determine the strictinin contents in different kinds of tea leaves in order to select the tea leaves having the lower strictinin content among them. For example, by selecting the tea leaves having the strictinin content obtained by acid extraction about 0.43% or less, the strictinin content in the extract or formulation is about 6 ppm or less. Moreover, by selecting the tea leaves having the strictinin content about 0.37% or less, the strictinin content of the extract or formulation is the level that the secondary sediment does not occur in any condition during the manufacturing process.

The above-mentioned raw tea leaves, if necessary, is treated by the well-known finishing-process, and the obtained finished tea is subjected to the next extraction process. There, the finishing process does not affect the strictinin content in the tea extract.

The "extraction of raw tea leaves," for example, can be done, as is well known, in the ordinary process using an extractor called "kneader", extracting with 20–50 times of extraction water to the raw tea leaves at 0–100° C. under an atmospheric pressure for about 1–20 minutes, stirring the extract one to several times, if necessary. The extraction methods and conditions are not necessarily restricted to the above, and the extraction at an applied pressure is also applicable.

As the extraction water used at the extraction, hard water, soft water, ion-exchanged water, natural water, aqueous solution containing ascorbic acid or pH-adjusted water are applicable. Since the strictinin content of the extract obtained by extraction is affected by pH of the extraction water, the strictinin content of the extract increases when the pH of the extraction water is adjusted at an acidic range, especially, pH4.5 or less. On the other hand, the strictinin content of the extract can be reduced by increasing the pH of the extract, for example, by adjusting the pH at a weak or neutral acidic range. When, for example, the strictinin content of a tea formulation of before-heat-sterilization exceeds the predetermined level, it is possible to control the extracted amount of strictinin by increasing the pH of the extraction water. The extracted amount of strictinin can be effectively controlled by adjusting the extraction water to pH5 or above, more preferably, to pH6 or above. However, such extraction in a weak or neutral acidic range is disclosed as just one of the techniques reducing the strictinin concentration in the extract, so that it is not necessarily preferable to carry out the extraction at a weak or neutral acidic range for the manufacturing process in the present invention. This is because, as the pH increases, the deterioration of catechin is facilitated. There, it is preferable to adjust the extract to pH 6.5–7 at most.

Moreover, although the extracting temperature, namely, the temperature of the warm extraction water, also affects the strictinin content of the extract, it is generally preferable to extract with warm water of 45–100° C., more preferably, 60–90° C.

The extract obtained by extraction is subjected to cool about 5–40° C., if necessary. The extract is, if necessary, adjusted at an acidic range of pH4–5 by adding ascorbic acid and sodium ascorbate to the extract before, after, or at the same time of cooling the extract. By cooling or acidity adjusting of the extract, it is possible to prevent the oxidation of the extracted components, as well as increasing the efficiency of the next centrifugation process by precipitating the cause substances of the primary sediment.

For the "filtration process," it is preferable to carry out the crude filtration removing the extraction residue, such as tealeaves or large fine powder, and also, to carry out the filtration removing the cause substances of the primary sediment. It is optional to carry out the said crude filtration or the said filtration removing the cause substances of the primary sediment anywhere in the manufacturing process.

For the crude filtration, it is optional to carry out the current filtration methods using a flannel, a stainless filter, a strainer and others to remove the extraction residue.

Removing the cause substances of primary sediment can be carried out by kieselguhr filtration or other appropriate membrane filtrations.

Centrifugation may be carried out at 5,000–10,000 rpm, and it is preferable to cool the extract or formulation about 5–40° C. prior to centrifugation.

At the kieselguhr filtration, it is not always necessary to centrifuge, but centrifuging before the process results in reducing the time for the filtration accompanying with the increase of the penetration flow rates.

As the membrane filtration, the membrane separations, such as microfiltration, ultrafiltration, reverse osmosis membrane filtration, electro-dialysis and bio-functional membrane can be carried out, and the combination with the above-mentioned kieselguhr filtration using a filter aid is also applicable.

It is optional to adjust methods or conditions of the above-mentioned centrifugation, kieselguhr filtration and membrane filtration. The correlation between the selection of methods and conditions for the centrifugation, kieselguhr filtration and membrane filtration, and the changes of the strictinin contents has not been established yet. It is, however, preferable to determine the strictinin content, changing the methods and conditions within those centrifugation, kieselguhr filtration or membrane filtration in various ways, and then, with the predetermined strictinin content as an indicator, manage the manufacturing process of selecting the methods or conditions.

For the "formulation process," the same as the ordinary manufacturing process of tea beverages, mainly, the pH, concentrations (Brix value), and tastes are adjusted by adding at least one or more of water (hard water, soft water, ion-exchanged water, natural water and others), ascorbic acid, sodium ascorbate, sodium bicarbonate, saccharides, dextrin, flavor, emulsifier, stabilizer or other seasoning materials.

For the correlation with the secondary sediment, when the concentration (Brix value) decreases, the strictinin concentration as well as the concentration of the binding components, such as protein, bind with "ellagic acid" derived from the decomposition of the strictinin by heat-sterilization, also decreases, so that the occurrence of secondary sediment is prevented. Therefore, when the strictinin content of a tea formulation of before-heat-sterilization is determined and exceeds the predetermined level, decreasing the concentration (Brix value) of the tea formulation is one of the countermeasures in the manufacturing management. However, in order to keep a good flavor of the tea beverages, it is preferable to concentrate the tea formulation (Brix value) to 0.1–0.4, more preferably, to 0.2–0.3.

Moreover, when the strictinin content of the formulation is determined and exceeds the predetermined value, carrying out a treating process that can decrease the strictinin content of the tea extract or formulation is also one of the countermeasures.

For the "heat-sterilization process", after the re-heating (when it is necessary), filling the formulation to retort-sterilize at 121° C. for 7 minutes under an appropriate pressure, such as at 1.2 mmHg, for can beverages; or to carry out the ultra high temperature (UHT) sterilization keeping the formulation at 120–150° C. for one second to several tens of seconds for plastic-bottle beverages.

Although, the clear correlation between the selection on methods or conditions of heat-sterilization and the strictinin content has not been established yet, in the present invention, it is preferable to control the manufacturing process with a predetermined value as an indicator, where the contents of ellagic acid and strictinin in a tea formulation of after-heat-sterilization are determined by changing the methods or conditions of heat-sterilization in various ways.

One of the preferable embodiments is described hereafter, however, the present invention is not necessary restricted to this embodiment.

Using the several kinds of raw tea leaves as the raw materials to carry out an ordinary process for manufacturing tea beverages to determine the strictinin content of before-heat-sterilization during the process.

Extracting raw tea leaves using an extractor called "kneader," with 20–50 times of extraction water (ion-exchanged water) to the raw tea leaves at 60–90° C. under an atmospheric pressure for about 1–20 minutes while stirring, to determine the strictinin content of the obtained tea extract. Cooling the obtained extract about 5–40° C., and at the same time, adding sodium ascorbate to adjust the tea extract of pH 4–5, followed by crude filtration, centrifugation and kieselguhr filtration, in the order. The same as the ordinary tea beverages, adding water, ascorbic acid or sodium ascorbate, sodium bicarbonate, saccharides, dextrin, flavors, emulsifiers and stabilizers to the obtained filtrate to adjust the pH, concentrations and tastes, to determine the strictinin content of thus obtained tea formulation.

Like this, determining the strictinin contents of the tea extract or formulation of several kinds of raw tea leaves to examine whether the strictinin content exceeds a predetermined level, selecting the raw tea leaves that the strictinin contents do not exceed the predetermined level from which, considering such as the flavor, specify the raw tea leaves.

For the raw tea leaves, the present inventors found that when the varieties, products area, plucking period and means, and cultivating methods are different, the strictinin contents of the tea leaves are different.

It is also possible to prevent the secondary sediment occurrence with the strictinin content at or below the predetermined level by the acidic extraction of tea leaves, the dilution of the concentration of tea extract and formulation of before-heat-sterilization, the adjustment of the storage conditions, or other means. The method, however, described as above, adjusting the strictinin content of tea beverages at or below the predetermined level by selecting the raw tea leaves is considered as the most simple and reliable way.
(Determination of Strictinin Content)

In order to determine the strictinin content in a tea extract or formulation, determining the content with high performance liquid chromatography (HPLC) is applicable.

It is optional to carry out the process determining the strictinin content in a tea extract or formulation during the manufacturing process any time if it is carried out before the heat-sterilization process.

The inventors found that the strictinin in tea beverages gradually decompose to ellagic acid during the storage, and when it is stored under a constant condition, namely, below pH4.5, the strictinin does not decompose to ellagic acid.
Test 1 (Sediment-Forming Test)

Extracting 20 g commercial green tea (a refined tea, "OI OCHA, Highland First Pluck 1500" produced by ITO. EN, LTD.) with 800 ml, 70° C. and pH5.9 distilled water for 3.5 minutes, to remove the insoluble fraction by centrifugation at 7000 rpm for 10 minutes in order to pass the supernatant liquid through a column filled with polystyrene resin (DIAION HP-20 by Mitsubishi Chemical Industries Limited) to obtain "HP-20 unadsorbed-fraction". Then, it is required to wash the column with distilled water to elute with 80% methanol aqueous solution to evaporate to obtain the "HP-20 adsorbed-80%-methanol-fraction".

The following sediment-forming test is carried out for the samples shown in Table 1.

200 ml of the obtained "HP-20 unadsorbed-fraction" (Brix 0.4) is adjusted to 500 ml, pH6.0 and the ascorbic acid concentration of 500 ppm with ascorbic acid, sodium bicarbonate and ion-exchanged water, to be heat-sterilized at 121° C. for 7 minutes, stored at 37° C., and observed.

0.5 g of the obtained "HP-20 adsorbed-80%-methanol-fraction" is adjusted to 500 ml, pH6.0 and the ascorbic acid concentration of 500 ppm with ascorbic acid, sodium bicarbonate and ion-exchanged water, to be heat-sterilized at 121° C. for 7 minutes, stored at 37° C, and observed.

Adding 0.5 g of the "HP-20 adsorbed-80%-methanol-fraction" to 200 ml of the "HP-20 unadsorbed-fraction" (Brix 0.4), and the obtained "HP-20 unadsorbed-fraction +HP-20 adsorbed-80%-methanol-fraction" is adjusted to 500 ml, pH6.0 and the ascorbic acid concentration of 500 ppm with ascorbic acid, sodium bicarbonate and ion-exchanged water, to be heat-sterilized at 121° C. for 7 minutes, stored at 37° C., and observed.

The results of the test are shown in Table 1.

TABLE 1

|  | Week 1 | Week 2 | Week 3 | Week 4 |
| --- | --- | --- | --- | --- |
| HP-20 unadsorbed-fraction | − | − | − | − |
| HP-20 adsorbed-80%-methanol-fraction | − | − | − | − |
| HP-20 unadsorbed-fraction + HP-20 adsorbed-80%-methanol-fraction | + | + | + | + |

−: Non-sediment
+: Sediment occurred

The occurrence of secondary sediment is observed only in the "HP-20 unadsorbed-fraction +HP-20 adsorbed-80%-methanol-fraction". From the above results, at least one component of the cause substances of secondary sediment is contained in each of "HP-20 unadsorbed-fraction" and "HP-20 adsorbed-80%-methanol-fraction".
Test 2 (Analysis Test on Sediment Components)

The outline of the working procedure of this test is shown in FIG. 1.

Extracting 20 g commercial green tea (a refined tea: "OI OCHA, Highland First Pluck 1500" produced by ITO EN, LTD.) with 800 ml, 70° C. and pH5.9 distilled water for 3.5 minutes, to remove the insoluble fraction by centrifugation at 7000 rpm for 10 minutes in order to pass the supernatant liquid through a column filled with polystyrene resin (DIAION HP-20 by Mitsubishi Chemical Industries Limited). Then, it is required to wash the column with distilled water to elute with methanol aqueous solutions in order of the rate from 20%, 40%, 60%, 80% and 100%.

The sediment-forming test is carried out as in Test 1, by adding the each obtained fraction to the "HP-20 unadsorbed-fraction" (Brix 0.4). The formation of secondary sediment is observed in the "HP-20 adsorbed-20%-methanol-fraction" and the "HP-20 adsorbed-40%-methanol-fraction". The formation amount of the sediment, especially, in the "HP-20 adsorbed-20%-methanol-fraction" is rich.

Then, evaporating the "HP-20 adsorbed-20%-methanol-fraction," to pass through a column filled with ODS (a reverse phase resin, COSMOSIL 75C18OPN by Nacalai Tesque, Inc.), to wash the column with distilled water, to elute with aqueous methanol solutions in order of the rate from 10%, 20% and 30%.

The sediment-forming test for the each obtained fraction is carried out as for the HP-20 fractions. Since the formation amount of the sediment in the "ODS adsorbed-10%-methanol-fraction" is richer, the said "ODS adsorbed-10%-methanol-fraction" is further fractionated by HPLC (Recycling Preparative HPLC, LC-908 by Japan Analytical Industry Co., Ltd.) with a reverse phase column (Wakosil-II5 C 18HG Prep by Wako Pure Chemical Industries, Ltd.). The same sediment-forming test is further carried out for each of the 6 peaks obtained with a solvent having a composition of methanol:water:acetic acid=22:78:0.1.

From the test, the sediment formation is observed in peak 3. The peak 3 is identified with Liquid Chromatography-Mass Spectrometer (LC-MS) and Nuclear Magnetic Resonance (NNM). The identified sediment is the strictinin.

For the "HP-20 adsorbed-40%-methanol-fraction", when the same identification as the above is carried out, the strictinin is likewise contained. In addition, the components in the fraction, except for strictinin, are not involved in the sediment forming.

Test 3 (Characteristic Property of Strictinin in Beverage Process)

Adding 20 g commercial green tea (a refined tea "OI OCHA, Highland First Pluck 1500" produced by ITO EN, LTD.) to 800 ml, 70° C. and pH5.9 ion-exchanged water to stir, to extract for 3.5 minutes stirring every one minute. Then, the said extract is crude-filtrated with a mesh (150 mesh) to cool to room temperature, to filtrate with a flannel (50 μm). Adding 0.4 g ascorbic acid to the obtained extract to centrifuge at 7000 rpm for 10 minutes, the supernatant liquid is microfiltrated (1 μm microfiltration (MF) membrane by Advantec Toyo Kaisha, Ltd.), 0.6 g ascorbic acid is added to the filtrate to adjust Brix 0.3 and pH6.0 with ion-exchanged water and sodium bicarbonate, to obtain a "formulation of before-heat-sterilization".

Heating the said "formulation of before-heat-sterilization" up to 97° C. to fill in a can, to cool rapidly, to retort-sterilize at 121° C. for 7 minutes. Then, it is required to cool again to obtain a "formulation of after-heat-sterilization".

Stirring the obtained "formulation of before-heat-sterilization" and "formulation of after-heat-sterilization" to treat with 0.45 μm filter in order to determined the strictinin concentration with HPLC under the conditions as follows:

| HPLC conditions | |
|---|---|
| Apparatus: | Hitachi D-7000 Advanced HPLC, D-7000 type of advanced HPLC system manager |
| Column: | Wakosil-II 5 C 18HG φ 4.6 × (30 + 250) mm |
| Column temperature: | 40° C. |
| Flow rate: | 0.6 ml/min |

| HPLC conditions -continued | |
|---|---|
| Detection: | UV280 |
| Mobile phase A: | 15% MeOH (containing 0.1% phosphoric acid) |
| Mobile phase B: | 45% MeOH (containing 0.1% phosphoric acid) |

TABLE 2

| Time (min.) | Mobile phase A | Mobile Phase B |
|---|---|---|
| 0.0 min. | 100% | 0% |
| 20.0 min. | 100% | 0% |
| 20.1 min. | 0% | 100% |
| 40.0 min. | 0% | 100% |
| 40.1 min. | 100% | 0% |
| 60.0 min. | 100% | 0% |

Injecting 5 μL of the sample to determine the peak appeared at a retention time of about 19 minutes by the absolute calibration method with the strictinin as an indicator extracted and purified in the Test 2. The results are shown in Table 3.

TABLE 3

| | Amount of strictinin/ppm |
|---|---|
| Formulation of before-heat-sterilization | 15.3 |
| Formulation of after-heat-sterilization | 0 |

From the results, strictinin is likely to be decomposed or precipitated by heat-sterilization. Moreover, since the strictinin contained in tea beverages completely decompose where the heat-sterilization has commonly taken place in a manufacturing process of tea beverages, the strictinin will be rarely found in beverages sold in the market. In case of ultra high temperature (UHT) sterilization, in some cases, the strictinin does not decompose.

Test 4 (Heat Decomposition Test of Strictinin)

Dissolving 5 mg purified strictinin and 250 mg ascorbic acid in ion-exchanged water to adjust to 500 ml at pH 6.0 with ion-exchanged water and sodium bicarbonate. Then, retort-sterilizing the said solution at 121° C. for 7 minutes.

Figure 2:
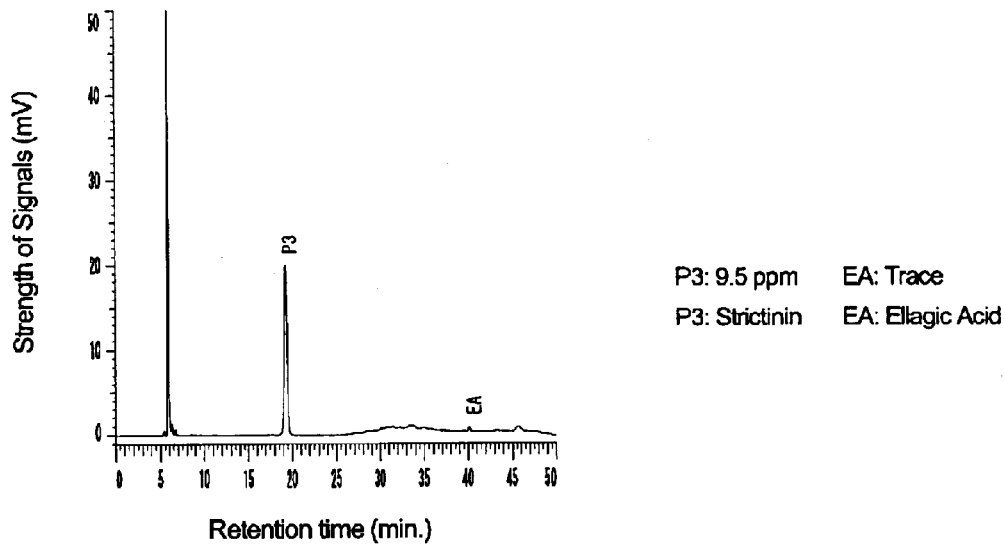
FIG. 2 is a graph showing the results of the determination by high performance liquid chromatography (HPLC) of strictinin contents and ellagic acid contents of both "prepared solution of before-heat-sterilization" and "prepared solution of after-heat-sterilization" after the purified strictinin solution is retort-sterilized in Test 4.
Figure 2:
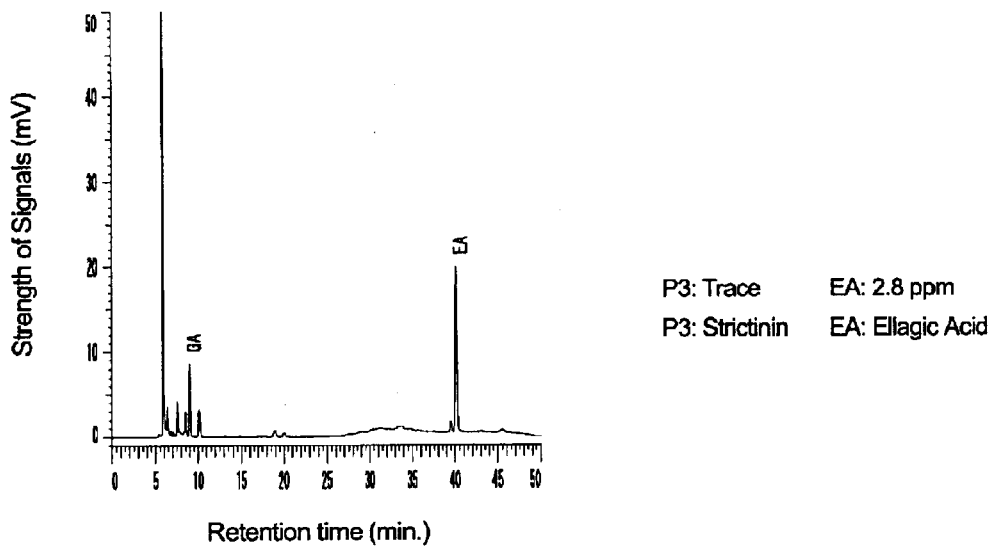

The each "prepared solution of before-heat-sterilization" and "prepared solution of after-heat-sterilization" are analyzed by HPLC as in Test 3. A peak is appeared at a retention time of about 40 minutes, and the peak is identified by LC-MS and NMR. The peak is the ellagic acid. The results are shown in FIG. 2.

From the results, the retort-sterilized strictinin forms the ellagic acid.

Figure 3:
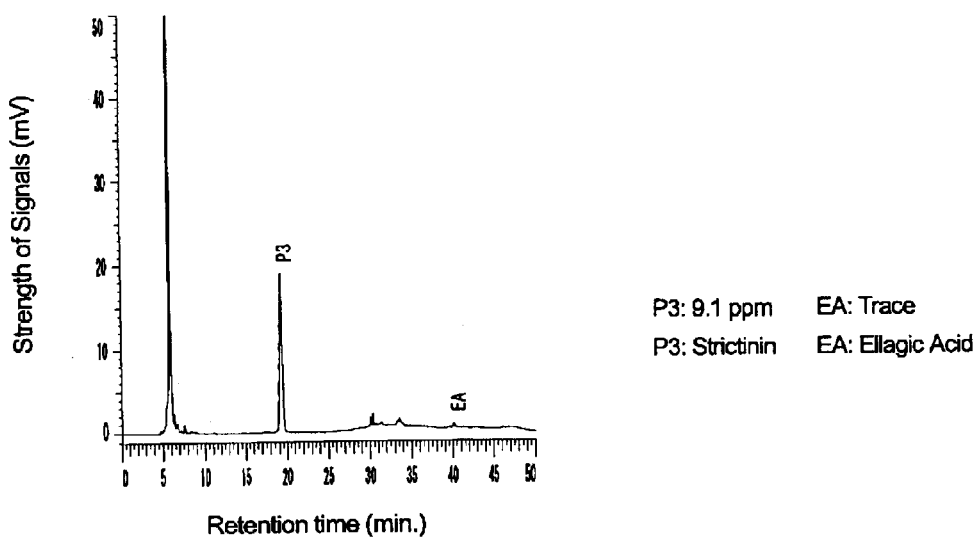
FIG. 3 is a graph showing the results of the determination by HPLC of strictinin contents and ellagic acid contents of both the "prepared solution of before-the-heat-sterilization" and the "prepared solution of after-heat-sterilization" after the prepared solution, obtained by adding the purified strictinin to the "HP-20 unadsorbed-fraction" obtained in Test 1, is retort-sterilized in Test 4.
Figure 3:
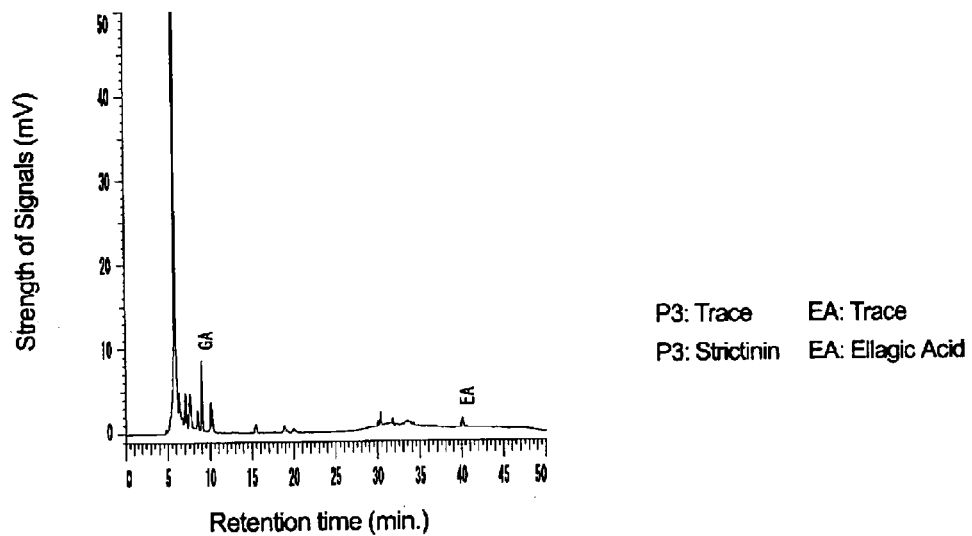

Further, adding 5 mg purified strictinin to 200 ml "HP-20 unadsorbed-fraction" obtained in Test 1 (Brix 0.4) to adjust to 500 ml and pH 6.0 with ion-exchanged water and sodium bicarbonate. Then, the said prepared solution is retort-sterilized at 121° C. for 7 minutes. For the each "prepared solution of before-heat-sterilization" and "prepared solution of after-heat-sterilization," strictinin and ellagic acid are determined by HPLC, as the above. The results are shown in FIG. 3.

In this time, however, ellagic acid is rarely detected in the "prepared solution of after-heat-sterilization". Thus, when a tea beverage is sterilized, the strictinin in the beverage decomposes to form ellagic acid, and said ellagic acid binds with a component contained in the "HP-20 unadsorbed-fraction" to form precipitates, that is, the secondary sediment.

Test 5 (Comparison Test of pH at the Extraction)

The extracted amounts of strictinin where tea leaves are extracted with an acidic aqueous solution and a basic aqueous solution are compared.

Preparing 800 ml, 70° C. and pH5.9 ion-exchanged water, acidic aqueous solution or basic aqueous solution to add 20 g commercial green tea (a refined tea, "OI OCHA, Highland First Pluck 1500" produced by ITO EN, LTD.). The solutions are stirred, and extracted for 3.5 minutes stirring every one-minute. The said solutions are crude-filtrated with a mesh (150 mesh) to cool to room temperature to filtrate with a flannel (5 $\mu$m). Adding 0.5 g ascorbic acid to the obtained basic extract and to the ion-exchanged water, respectively. For the acidic extract, without addition of ascorbic acid, centrifuging at 7000 rpm for 10 minutes, the supernatant liquid is filtrated with a microfiltration membrane (1 $\mu$m MF membrane, Advantec Toyo Kaisha, Ltd.) to add 0.5 g ascorbic acid, to adjust the solution to 200 ml with ion-exchange water to obtain a formulation. The strictinin concentration of the said formulation is determined by HPLC as in Test 3. The results are shown in Table 4.

The above-mentioned acidic aqueous solution is prepared by adding 0.5 g ascorbic acid to 800 ml and pH5.9 ion-exchanged water to adjust to pH 3.4, and the basic aqueous solution is prepared by adding 0.5 g sodium carbonate to 800 ml ion-exchanged water to adjust to pH 8.5.

TABLE 4

| pH of extractions | Brix of formulations | Strictinin in formulations |
|---|---|---|
| 8.5 pH | 0.404% | 15.9 ppm |
| 5.9 pH | 0.400% | 21.4 ppm |
| 3.4 pH | 0.400% | 33.4 ppm |

From the results, carrying out the acidic extraction resultes in the extracted amount of strictinin richer.

Test 6 (Comparison of the Extracted Amount of Strictinin in the Acidic Extraction)

Adding 0.5 g ascorbic acid to 800 ml and pH5.9 ion-exchanged water to adjust to pH3.4, to extract at each temperature of 90° C., 70° C., 50° C. and 30° C. for 10 minutes to obtain formulations as the acidic aqueous solutions prepared in Test 5. Then, the strictinin concentrations of those solutions are determined by HPLC as in Test 3. The results are shown in Table 5.

TABLE 5

| Extraction temperatures | Brix of formulations | Strictinin in formulations |
|---|---|---|
| 90° C. | 0.417% | 36.6 ppm |
| 70° C. | 0.404% | 34.1 ppm |
| 50° C. | 0.351% | 25.0 ppm |
| 30° C. | 0.316% | 15.0 ppm |

From the results, the extracted amounts of strictinin are richer at the temperature of 70° C. and the higher.

Test 7 (Comparison of Extraction Time)

Adding 0.5 g of ascorbic acid to 800 ml and pH5.9 ion-exchanged water to adjust to pH3.4, to extract for 3 minutes, 5 minutes and 20 minutes, respectively, in order to obtain the formulations as the acidic aqueous solutions prepared in Test 5. The strictinin concentrations of the said formulations are determined by HPLC as in Test 3, and the results are shown in Table 6.

TABLE 6

| Extraction times | Brix of formulations | Strictinin in formulations |
|---|---|---|
| 3 min. | 0.359% | 23.2 ppm |
| 5 min. | 0.396% | 29.2 ppm |
| 20 min. | 0.428% | 34.7 ppm |

There is no difference in the comparison of the strictinin concentrations between the extraction extracted at 70° C. for 10 minutes in Test 6 and the extraction extracted at 70° C. for 20 minutes in Test 7. Therefore, from the results of Test 5 to Test 7, it is preferable to extract with aqueous solution having pH4.5 or less for 5 minutes or more in order to increase the extraction amount of strictinin.

Test 8 (Ellagic Acid Adding Test)

Adding ellagic acid to the "HP-20 unadsorbed-fraction" obtained in Test 1 to observe the sediment forming.

Adding 2.1 mg commercial ellagic acid (Sigma Chemical Co.) and 250 mg ascorbic acid to 200 ml of the "HP-20 unadsorbed-fraction" (Brix 0.4) obtained in Test 1, to adjust to 500 ml and pH6.0 with ion-exchanged water and sodium bicarbonate, the said prepared solution is retort-sterilized at 121° C. for 7 minutes to obtain "ellagic acid+HP-20 unadsorbed-fraction" at 37° C. to observe the changes over the time.

Also, adding 2.1 mg commercial ellagic acid (Sigma Chemical Co.) and 250 mg ascorbic acid to ion-exchanged water to adjust to 500 ml and pH6.0 with ion-exchanged water and sodium bicarbonate, the said formulation is retort-sterilized at 121° C. for 7 minutes to observe the obtained "ellagic-acid-only-solution" as the above. The results are shown in Table 7.

TABLE 7

| | Sediment Occurrence after 3 days at 37° C. |
|---|---|
| Ellagic acid only | − |
| Ellagic acid + HP-20 unadsorbed-fraction | + |

−: Non-sediment
+: Sediment occurred

From all the above results, the strictinin in the tea extract decomposed by heat-sterilization forms ellagic acid, and said ellagic acid binds with components contained in the "HP-20 unadsorbed-fraction" to form flock precipitates, that is, the secondary sediment in the tea beverages.

Test 9 (Analysis of Components Involved in the Sediment Formation in the "HP-20 Unadsorbed-Fraction")

Treating the flock precipitates (sediment) formed in tea beverages with hydrochloric acid and methanol, to dissolve the ellagic acid contained in the said precipitates to analyze the components of said precipitates.

Then, storing the solution prepared by the method of Test 1 ("HP-20 unadsorbed-fraction+HP-20 adsorbed-80%-methanol-fraction") at 37° C. for 5 days to precipitate, and the precipitates are recovered with MS filter (0.45 $\mu$m). Washing the said filter with methanol, to centrifuge thus obtained to recover the precipitates. Further washing them with 1% hydrochloric acid and methanol, to centrifuge again, and then, to air-dry to obtain samples to be used for sodium dodecyl sulfate-poly acrylamide gel electrophoresis (SDS-PAGE).

From the analysis of the components with SDS-PAGE, it shows that protein is very rich in the precipitates and very little carbohydrate is detected in the said precipitates.

Test 10 (Model Test Using Amino Acids and Proteins)

Administering 1 mg ellagic acid to the amino acid standards (Kyowa Hakko Kogyo Co., Ltd.) or bovine serum albumin (Sigma Chemical Co.), shown in Table 8 with the amount stated, in a test tube, and adding ion-exchanged water adjusting to the total volume of 10 ml. Then, the solution is heat-sterilized at 121° C. for 15 minutes and stored at room temperature to observe.

TABLE 8

| Standards | Administration (mg) | Standards | Administration (mg) |
|---|---|---|---|
| Aspartic acid | 3.18 | Valine | 2.97 |
| Serine | 2.51 | Methionine | 2.89 |
| Glutamic acid | 2.05 | Lysine | 1.95 |
| Glycine | 1.39 | Isoleucine | 2.62 |
| Histidine | 1.96 | Leucine | 3.33 |
| Arginine | 1.52 | Phenylalanine | 3.00 |
| Threonine | 1.02 | Glutamine | 4.25 |
| Alanine | 1.16 | Asparagin | 6.31 |
| Proline | 0.94 | Theanine | 3.03 |
| Cysteine | 2.20 | Bovine Serum Albumin | 2.47 |
| Tyrosine | 3.61 | | |

Storing all the amino acids at room temperature for 18 days to observe the flock precipitates.

The flock precipitates are found in the bovine serum albumin solution of after-heat-sterilization, but not in the solution of before-heat-sterilization.

From the above results, the substances bind with ellagic acid which form precipitates (secondary sediment) are amino acids, peptides and proteins, due to the deterioration of said components by heat-sterilization or long-term-storage.

Test 11 (Correlation Between Strictinin Concentration in Tea and Sediment Formation—1)

The strictinin concentrations in all tea leaves of 14 kinds of crude tea produced in Shizuoka, Japan, are determined by HPLC as in Test 3.

In order to determine the strictinin concentrations in raw tea leaves, while one test solution is prepared according to the "Hot-water extraction method" adopted in the preparation method of the test solution in tannin assay of tea in the official analysis method ("Quantitative Analysis of Tea Constituents", Tea Research Journal No. 71, p52 (1990), The Ministry of Agriculture, Forestry and Fisheries, National Research Institute of Vegetable, Ornamental Plants and Tea), another test solution is prepared according to the "Acidic hot-water extraction method" which is the originally developed process in the present invention modified from the hot-water extraction process.

In the hot-water extraction process, weighing 0.5 g mill ground green tea leaves in a 100 ml volumetric flask, and the said ground green tea leaves are extracted with about 80 ml boiled ion-exchanged water (pH 5.9) for 10 minutes stirring every 3 minutes to obtain a "hot-water extract".

In the acidic hot-water process, weighing 0.5 g of mill ground green tea leaves in a 100 ml volumetric flask, and the said ground green tea leaves are extracted with about 80 ml aqueous solution (pH2.0), prepared by adding 0.1% phosphoric acid to the boiled ion-exchanged water, for 10 minutes stirring every 3 minutes to obtain a "acidic extract".

Cooling both the "hot-water extract" and the "acidic extract", and ion-exchanged water (pH5.9) is added to the "hot-water extract", the said phosphoric acid added aqueous solution is added to the "acidic extract" to make a total volume of 100 ml, respectively. Filtrating the each solution with a filter (No. 2 Filter, Advantec Toyo Kaisha, Ltd.) to determine the strictinin concentrations by HPLC as in Test 3. The results are shown in Table 9.

Also, adding 20 g of the above-mentioned tea leaves (crude tea produced in Shizuoka, Japan) to 800 ml, pH5.9 ion-exchange water of 70° C. to stir. Extracting it for 3.5 minutes stirring every one minute, the obtained extract is filtrated with a mesh (150 mesh), to cool rapidly to room temperature, to filtrate with a flannel (50 μm). Adding 0.4 g ascorbic acid to the said extract to centrifuge at 7000 rpm for 10 minutes, and the obtained supernatant liquid is filtrated with microfiltration (1 μm MF membrane, Advantec Toyo Kaisha, Ltd.). Adding ascorbic acid to ion-exchanged water and sodium bicarbonate adjusting pH 6.0, Brix 0.1 (0.03 by weigh of tea solid) to 0.3 (0.23 by weigh of tea solid) and ascorbic acid of 500 ppm to obtain formulations, and the strictinin concentration in the obtained formulation is determined by HPLC as in Test 3.

Further, in order to observe the sediment-forming, heating the said formulation to 97° C., to fill in a heat-resistant bottle to cool rapidly, to retort-sterilize at 121° C. for 7 minutes. Then, it is required to cool again to store the formulation at 37° C., to observe the changes over the time. The results are shown in Tables 9–11, FIGS. 4–5.

The ratio of strictinin solid portion in the tea solid portion in Table 9 is the strictinin content (%) to the whole tea solid portion in the formulation.

Table 10 shows that the strictinin concentrations in the tea leaves by the hot-water extraction in Table 9 are arranged in descending order, and Table 11 shows that the strictinin concentrations in the tea leaves by the acidic extraction in Table 9 are arranged in descending order.

Figure 4:
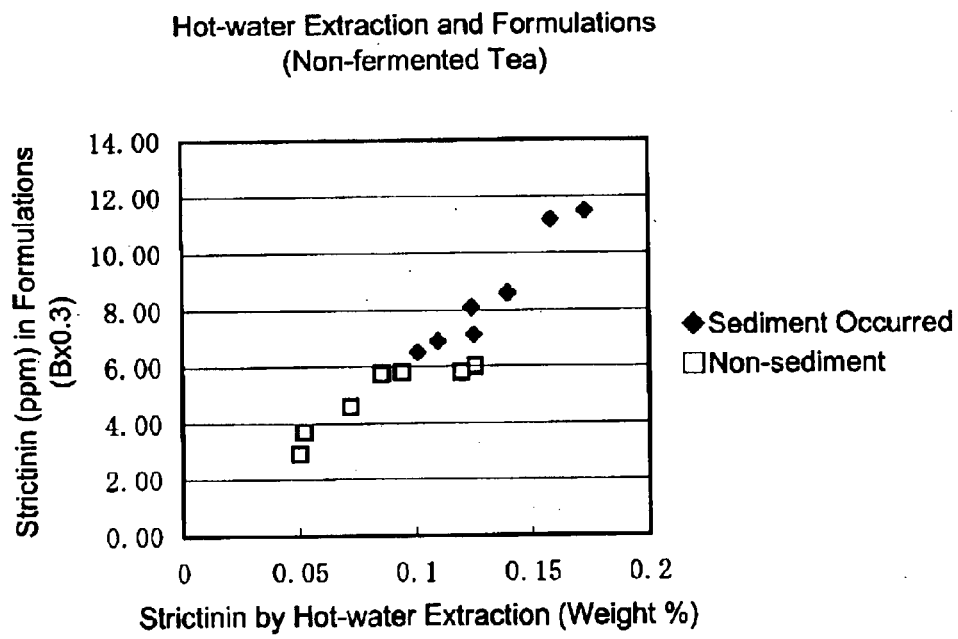
FIG. 4 is a graph as determined in Test 11 that the occurrence or non-occurrence of the secondary sediment is plotted on the coordinate, the abscissa axis indicates the strictinin concentration (weight %) in the tea leaves by the hot-water extraction, and the ordinate axis indicates the strictinin concentration (ppm) in the formulation in the case that the Brix is adjusted to 0.3 (0.23 by weigh of tea solid).

FIG. 4 is a graph that the occurrence or non-occurrence of the secondary sediment is plotted on the coordinate, the abscissa axis indicates the strictinin concentration (weight %) in the tea leaves by the hot-water extraction, and the ordinate axis indicates the strictinin concentration (ppm) in the formulation in the case that the Brix is adjusted at 0.3 (0.23 by weigh of tea solid).

Figure 5:
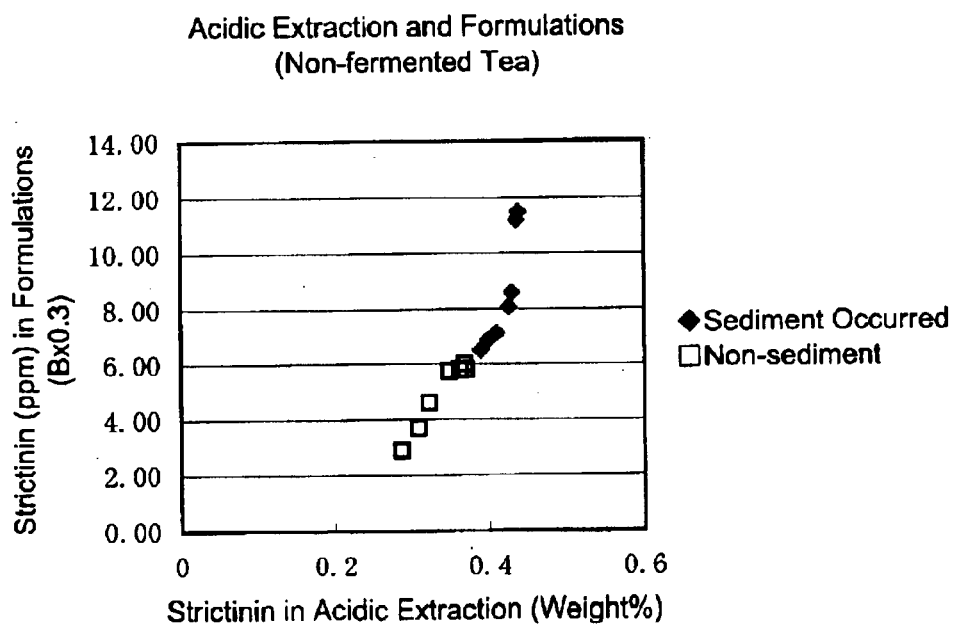
FIG. 5 is a graph as determined in Test 11 that the occurrence or non-occurrence of the secondary sediment is plotted on the coordinate, the abscissa axis indicates the strictinin concentration (weight %) in the tea leaves by the acidic extraction, and the ordinate axis indicates the strictinin concentration (ppm) in the formulation in the case that the Brix is adjusted to 0.3 (0.23 by weigh of tea solid).

FIG. 5 is a graph that the occurrence or non-occurrence of the secondary sediment is plotted on the coordinate, the abscissa axis indicates the strictinin concentration (weight %) in the tea leaves by the acidic extraction, and the ordinate axis indicates the strictinin concentration (ppm) in the formulation in the case that the Brix is adjusted at 0.3 (0.23 by weigh of tea solid).

TABLE 9

| Green Tea | Strictinin in Crude Tea/Wt. % | | Strictinin in Formulations | Sediment Formation Stored at 37° C. | | | |
|---|---|---|---|---|---|---|---|
| Lot Nos. | Acidic Ext. | H-W Ext. | ppm (*%) | Week 1 | Week 2 | Week 3 | Week 4 |
| Lot 1 | 0.439 | 0.173 | 11.48 (0.51) | ++ | ++ | ++ | ++ |
| Lot 2 | 0.436 | 0.158 | 11.18 (0.49) | ++ | ++ | ++ | ++ |
| Lot 3 | 0.390 | 0.101 | 6.50 (0.29) | − | − | − | + |
| Lot 4 | 0.369 | 0.126 | 6.00 (0.27) | − | − | − | − |

TABLE 9-continued

| Green Tea | Strictinin in Crude Tea/Wt. % | | Strictinin in Formulations | Sediment Formation Stored at 37° C. | | | |
|---|---|---|---|---|---|---|---|
| Lot Nos. | Acidic Ext. | H-W Ext. | ppm (*%) | Week 1 | Week 2 | Week 3 | Week 4 |
| Lot 5 | 0.370 | 0.120 | 5.80 (0.26) | − | − | − | − |
| Lot 6 | 0.399 | 0.110 | 6.88 (0.30) | − | − | − | + |
| Lot 7 | 0.362 | 0.094 | 5.80 (0.26) | − | − | − | − |
| Lot 8 | 0.349 | 0.086 | 5.75 (0.25) | − | − | − | − |
| Lot 9 | 0.410 | 0.126 | 7.13 (0.32) | − | − | + | + |
| Lot 10 | 0.426 | 0.125 | 8.09 (0.36) | + | + | + | + |
| Lot 11 | 0.430 | 0.140 | 8.59 (0.38) | + | + | + | + |
| Lot 12 | 0.308 | 0.052 | 3.70 (0.16) | − | − | − | − |
| Lot 13 | 0.286 | 0.050 | 2.90 (0.13) | − | − | − | − |
| Lot 14 | 0.322 | 0.072 | 4.60 (0.20) | − | − | − | − |

Wt.: Weight

Ext.: Extraction

H-W Ext.: Hot-water Extraction

*Formulations having Brix 0.3

(%): Ration of strictinin solid portion in tea solid portion

−: No sediment

+: Sediment was formed

++: Rich in sediment

TABLE 10

| Green Tea | Hot-water Ext. | Strictinin Amount (ppm) in Formulations (Ratio of Strictinin Solid Portion in Tea Solid Portion) | | | | |
|---|---|---|---|---|---|---|
| Lot Nos. | Strictinin/Wt. % | Bx 0.30 (0.23) | Bx 0.25 (0.18) | Bx 0.20 (0.13) | Bx 0.15 (0.08) | Bx 0.10 (0.03) |
| Lot 1 | 0.173 | 11.45 (0.51) | 8.94 (0.51) | 6.40 (0.51) | 3.87 (0.51) | 1.33 (0.51) |
| Lot 2 | 0.158 | 11.18 (0.49) | 8.70 (0.49) | 6.22 (0.49) | 3.76 (0.49) | 1.29 (0.49) |
| Lot 11 | 0.140 | 8.59 (0.38) | 6.69 (0.38) | 4.79 (0.38) | 2.89 (0.38) | 0.99 (0.38) |
| Lot 9 | 0.126 | 7.13 (0.32) | 5.55 (0.32) | 3.98 (0.32) | 2.40 (0.32) | 0.83 (0.32) |
| Lot 4 | 0.126 | 6.00 (0.27) | 4.67 (0.27) | 3.35 (0.27) | 2.02 (0.27) | 0.69 (0.27) |
| Lot 10 | 0.125 | 8.09 (0.36) | 6.30 (0.36) | 4.51 (0.36) | 2.73 (0.36) | 0.94 (0.36) |
| Lot 5 | 0.120 | 5.80 (0.26) | 4.52 (0.26) | 3.24 (0.26) | 1.95 (0.26) | 0.67 (0.26) |
| Lot 6 | 0.110 | 6.88 (0.30) | 5.36 (0.30) | 3.84 (0.30) | 2.32 (0.30) | 0.80 (0.30) |
| Lot 3 | 0.101 | 6.50 (0.29) | 5.06 (0.29) | 3.63 (0.29) | 2.19 (0.29) | 0.75 (0.29) |
| Lot 7 | 0.094 | 5.80 (0.26) | 4.52 (0.26) | 3.24 (0.26) | 1.95 (0.26) | 0.67 (0.26) |
| Lot 8 | 0.086 | 5.75 (0.25) | 4.48 (0.25) | 3.21 (0.25) | 1.94 (0.26) | 0.67 (0.25) |
| Lot 14 | 0.072 | 4.60 (0.20) | 3.58 (0.20) | 2.57 (0.20) | 1.55 (0.20) | 0.53 (0.20) |
| Lot 12 | 0.052 | 3.70 (0.16) | 2.88 (0.16) | 2.06 (0.16) | 1.25 (0.16) | 0.43 (0.16) |
| Lot 13 | 0.050 | 2.90 (0.13) | 2.26 (0.13) | 1.62 (0.13) | 0.98 (0.13) | 0.34 (0.13) |

Ext.: Extraction    Meshed parts show the sediment formation.

Wt.: Weight    Bx ( ): By weight of tea solid portion

TABLE 11

| Green Tea Lot Nos. | Acidic Ext. Strictinin/Wt. % | Strictinin Amount (ppm) in Formulations (Ratio of Strictinin Solid Portion in Tea Solid Portion) | | | | |
|---|---|---|---|---|---|---|
| | | Bx 0.30 (0.23) | Bx 0.25 (0.18) | Bx 0.20 (0.13) | Bx 0.15 (0.08) | Bx 0.10 (0.03) |
| Lot 1 | 0.439 | 11.45 (0.51)† | 8.94 (0.51)† | 6.40 (0.51)† | 3.87 (0.51) | 1.33 (0.51) |
| Lot 2 | 0.436 | 11.18 (0.49)† | 8.70 (0.49)† | 6.22 (0.49)† | 3.76 (0.49) | 1.29 (0.49) |
| Lot 11 | 0.430 | 8.59 (0.38)† | 6.69 (0.38)† | 4.79 (0.38) | 2.89 (0.38) | 0.99 (0.38) |
| Lot 10 | 0.426 | 8.09 (0.36)† | 6.30 (0.36)† | 4.51 (0.36) | 2.73 (0.36) | 0.94 (0.36) |
| Lot 9 | 0.410 | 7.13 (0.32)† | 5.55 (0.32) | 3.98 (0.32) | 2.40 (0.32) | 0.83 (0.32) |
| Lot 6 | 0.399 | 6.88 (0.30)† | 5.36 (0.30) | 3.84 (0.30) | 2.32 (0.30) | 0.80 (0.30) |
| Lot 3 | 0.390 | 6.50 (0.29)† | 5.06 (0.29) | 3.63 (0.29) | 2.19 (0.29) | 0.75 (0.29) |
| Lot 5 | 0.370 | 5.80 (0.26) | 4.52 (0.26) | 3.24 (0.26) | 1.95 (0.26) | 0.67 (0.26) |
| Lot 4 | 0.369 | 6.00 (0.27) | 4.67 (0.27) | 3.35 (0.27) | 2.02 (0.27) | 0.69 (0.27) |
| Lot 7 | 0.362 | 5.80 (0.26) | 4.52 (0.26) | 3.24 (0.26) | 1.95 (0.26) | 0.67 (0.26) |
| Lot 8 | 0.349 | 5.75 (0.25) | 4.48 (0.25) | 3.21 (0.25) | 1.94 (0.26) | 0.67 (0.26) |
| Lot 14 | 0.322 | 4.60 (0.20) | 3.58 (0.20) | 2.57 (0.20) | 1.55 (0.20) | 0.53 (0.20) |
| Lot 12 | 0.308 | 3.70 (0.16) | 2.88 (0.16) | 2.06 (0.16) | 1.25 (0.16) | 0.43 (0.16) |
| Lot 13 | 0.286 | 2.90 (0.13) | 2.26 (0.13) | 1.62 (0.13) | 0.98 (0.13) | 0.34 (0.13) |

Wt.: Weight  
Ext.: Extraction  
Bx ( ): By weight of tea solid portion  
† Meshed parts show the sediment formation.

While the extracted amount of strictinin is small by the hot-water extraction method adopted in the official method for the analysis of tannin, the extracted amount of strictinin is effectively increased by the acidic hot-water extraction method. Moreover, as clearly seen in FIGS. 4 and 5, the determination by the acidic hot-water extraction method has a greater correlation with the occurrence of the secondary sediment than that by the hot-water extraction method. From the result, it is preferable to adopt the acidic hot-water extraction method, preferably, the method carried out with the condition of pH2–4 at 70–100° C. for the determination of the strictinin contents in raw tea leaves.

From the results shown in Table 10 and FIG. 4, when the strictinin content in the tea leaves determined by the hot-water extraction method is 0.14% or less, the secondary sediment rarely occurs. Further, when the strictinin content is 0.10% or less, the secondary sediment does not occur at all.

From the results shown in Table 11 and FIG. 5, when the strictinin content in the tea leaves determined by the acidic extraction method is 0.43% or less, the secondary sediment rarely occurs. Further, when the strictinin content is 0.37% or less, the secondary sediment does not occur at all.

From the results shown in Table 11, when the strictinin content in the formulation is 6 ppm or less, or more precisely, 5 ppm or less, the secondary sediment does not occur.

In view of the ratio of strictinin content in the tea solid portion, in case of green tea beverages, since the ordinary formulation concentrations (Brix) are about 0.2–0.3 (0.13–0.23 in weigh of tea solid), the occurrence of the secondary sediment can be prevented when the strictinin content to the tea solid portion in a tea extract or formulation is controlled so as to be about 0.2–0.5% or less, specifically, about 0.2–0.4% or less. In other words, it is preferable to control the upper limit of the strictinin content of the tea solid portion, depending on the tea solid concentration of the formulation as an indicator. Thus, when the tea solid concentration (Brix) of tea extract or formulation is 0.23, it is preferable to specify the upper limit of the strictinin content of the tea solid portion as 0.27%. In the same way, when the Brix is 0.18, the strictinin content to be 0.34%, and when the Brix is 0.13, the strictinin content to be 0.48% to the tea solid portion.

Test 12 (Correlation Between Strictinin Concentration in Tea and Sediment Formation—2)

The strictinin concentrations in all tealeaves of 13 kinds of Kamairi-cha (Jasmine tea) produced in China are determined by HPLC as in Test 3. The strictinin concentrations of each kind and each step as well as the observation results on the sediment forming are shown in Table 12.

Adding 40 g of the above 13-kind Chinese Kamairi-cha leaves (Jasmine tea) to 1,000 ml, 80° C. and pH5.9 ion-exchanged water to stir thus obtained. Extracting it for 3.5 minutes stirring every one minute to filtrate the obtained extract with a mesh (150 mesh), to cool rapidly to room temperature, to filtrate with a flannel (50 μm), to centrifuge the solution at 7000 rpm for 10 minutes, to filtrate the supernatant liquid (1 μm MF membrane, Advantec Toyo Kaisha, ltd.). Then, ascorbic acid is added adjusting pH6.0, Brix 0.1–0.3 (0.03–0.23 in weigh of tea solid) and ascorbic acid of 500 ppm with ion-exchanged water and sodium bicarbonate to obtain formulations, in order to determine the strictinin concentrations in the formulations by HPLC as in Test 3.

Further, in order to observe the sediment-forming, heating the above formulations up to 97° C. to fill in a heat-resistant bottle to cool rapidly to retort-sterilize at 121° C. for 7 minutes. Then, it is required to cool down again to store at 37° C. to observe the changes over the time. The results are shown in Tables 12–14, and FIGS. 6–7.

The ratio of strictinin solid portion in the tea solid portion in Table 12 is the strictinin content (%) to the whole tea solid in the formulation.

Table 13 shows that the strictinin concentrations in the tea leaves by hot-water extraction in Table 12 are arranged in descending, and Table 14 shows that the strictinin concentrations in the tea leaves by acidic extraction in Table 12 are arranged in descending order.

Figure 6:
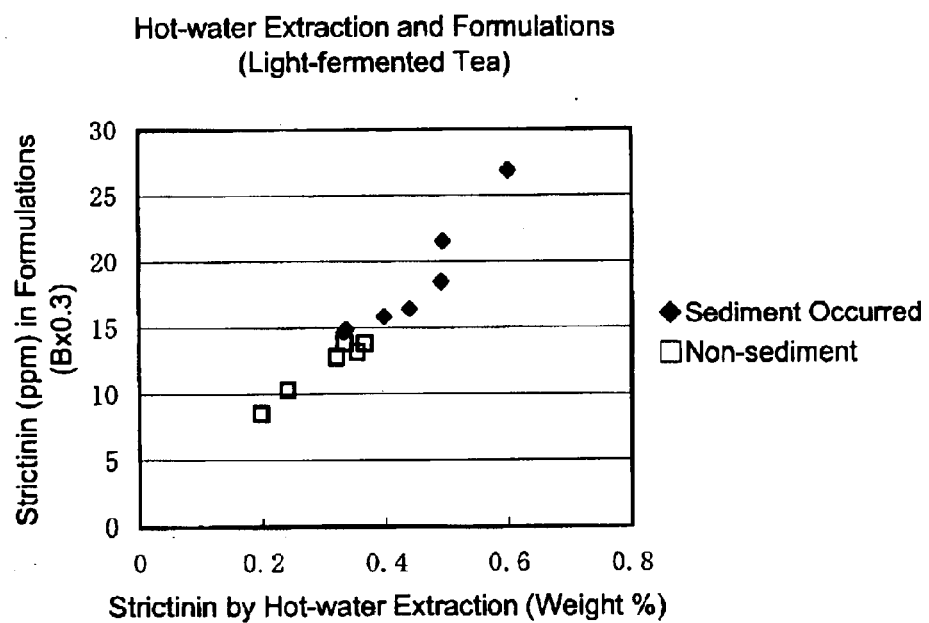
FIG. 6 is a graph as determined in Test 12 that the occurrence or non-occurrence of the secondary sediment is plotted on the coordinate, the abscissa axis indicates the strictinin concentration (weight %) in the tea leaves by the hot-water extraction, and the ordinate axis indicates the strictinin concentration (ppm) in formulation in the case that the Brix is adjusted to 0.3 (0.23 by weigh of tea solid).

FIG. 6 is a graph that the occurrence or non-occurrence of the secondary sediment is plotted on the coordinate, the abscissa axis indicates the strictinin concentration (weight %) in the tea leaves by the hot-water extraction, and the ordinate axis indicates the strictinin concentration (ppm) in formulation in the case that Brix is adjusted at 0.3 (0.23 by weigh of tea solid).

Figure 7:
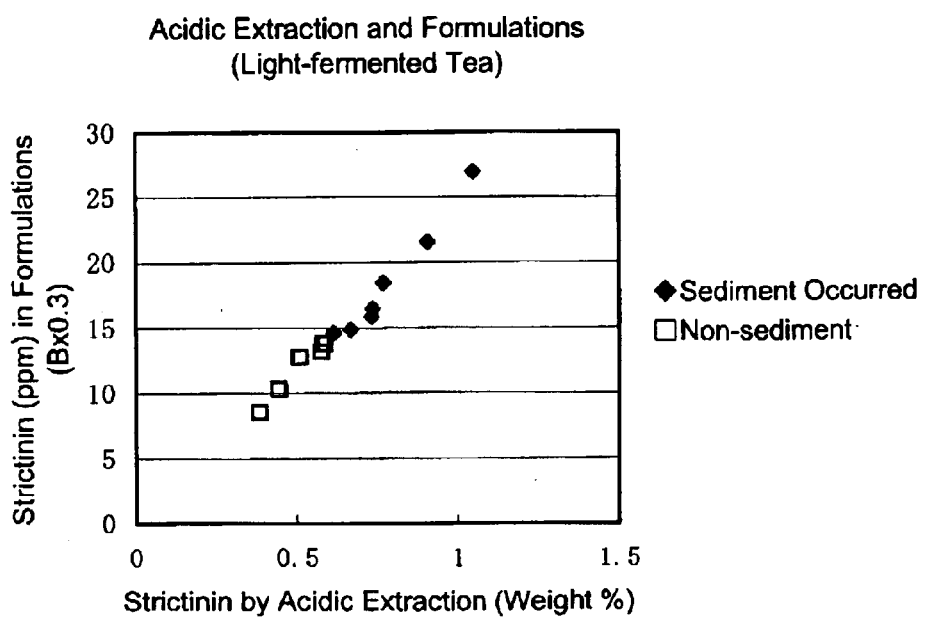
FIG. 7 is a graph as determined in Test 12 that the occurrence or non-occurrence of the secondary sediment is plotted on the coordinate, the abscissa axis indicates the strictinin concentration (weight %) in the tea leaves by the acidic extraction, and the ordinate axis indicates the strictinin concentration (ppm) in the formulation in the case that the Brix is adjusted to 0.3 (0.23 by weigh of tea solid).

FIG. 7 is a graph that the occurrence or non-occurrence of the secondary sediment is plotted on the coordinate, the abscissa axis indicates the strictinin concentration (weight %) in the tea leaves by the acidic extraction, and the ordinate axis indicates the strictinin concentration (ppm) in the formulation in the case that Brix is adjusted at 0.3 (0.23 by weigh of tea solid).

TABLE 12

| Jasmine Tea | Strictinin in Jasmine Tea/Wt. % | | Strictinin in Formulations | Sediment Formation Stored at 37° C. | | | |
| --- | --- | --- | --- | --- | --- | --- | --- |
| Lot Nos. | Acidic Ext. | H-W Ext. | ppm (*%) | Week 1 | Week 2 | Week 3 | Week 4 |
| Lot 1 | 1.049 | 0.601 | 26.94 (1.19) | ++ | ++ | ++ | ++ |
| Lot 2 | 0.907 | 0.494 | 21.52 (0.95) | + | ++ | ++ | ++ |
| Lot 3 | 0.769 | 0.491 | 18.43 (0.82) | + | + | + | + |
| Lot 4 | 0.578 | 0.365 | 13.81 (0.61) | − | − | − | − |
| Lot 5 | 0.574 | 0.354 | 13.18 (0.58) | − | − | − | − |
| Lot 6 | 0.585 | 0.333 | 13.81 (0.61) | − | − | − | − |
| Lot 7 | 0.736 | 0.440 | 16.46 (0.73) | + | + | + | + |
| Lot 8 | 0.667 | 0.336 | 14.86 (0.66) | − | − | − | + |
| Lot 9 | 0.732 | 0.398 | 15.85 (0.70) | − | − | − | + |
| Lot 10 | 0.613 | 0.333 | 14.63 (0.65) | − | − | + | + |
| Lot 11 | 0.508 | 0.321 | 12.79 (0.57) | − | − | − | − |
| Lot 12 | 0.444 | 0.241 | 10.30 (0.46) | − | − | − | − |
| Lot 13 | 0.383 | 0.198 | 8.54 (0.38) | − | − | − | − |

Wt.: Weight

Ext.: Extraction

H-W Ext.: Hot-water Extraction

*Formulations having Brix 0.3

(%): Ration of strictinin solid portion in tea solid portion

−: No sediment

+: Sediment was formed

++: Rich in sediment

TABLE 13

| Jasmine Tea | Hot-water Ext. | Strictinin Amount (ppm) in Formulations (Ratio of Strictinin Solid Portion in Tea Solid Portion) | | | | |
| --- | --- | --- | --- | --- | --- | --- |
| Lot Nos. | Strictinin/Wt. % | Bx 0.30 (0.23) | Bx 0.25 (0.18) | Bx 0.20 (0.13) | Bx 0.15 (0.08) | Bx 0.10 (0.03) |
| Lot 1 | 0.601 | 26.94 (1.19) | 20.99 (1.19) | 15.03 (1.19) | 9.08 (1.19) | 3.12 (1.19) |
| Lot 2 | 0.494 | 21.52 (0.95) | 16.76 (0.95) | 12.01 (0.95) | 7.25 (0.95) | 2.49 (0.95) |
| Lot 3 | 0.491 | 18.43 (0.82) | 14.36 (0.82) | 10.28 (0.82) | 6.21 (0.82) | 2.13 (0.82) |
| Lot 7 | 0.440 | 16.46 (0.73) | 12.82 (0.73) | 9.18 (0.73) | 5.54 (0.73) | 1.91 (0.73) |
| Lot 9 | 0.398 | 15.85 (0.70) | 12.34 (0.70) | 8.84 (0.70) | 5.34 (0.70) | 1.84 (0.70) |
| Lot 4 | 0.365 | 13.81 (0.61) | 10.76 (0.61) | 7.71 (0.61) | 4.65 (0.61) | 1.60 (0.61) |
| Lot 5 | 0.354 | 13.18 (0.58) | 10.27 (0.58) | 7.35 (0.58) | 4.44 (0.58) | 1.53 (0.58) |
| Lot 8 | 0.336 | 14.86 (0.66) | 11.58 (0.66) | 8.29 (0.66) | 5.01 (0.66) | 1.72 (0.66) |
| Lot 10 | 0.333 | 14.63 (0.65) | 11.39 (0.65) | 8.16 (0.65) | 4.93 (0.65) | 1.69 (0.65) |
| Lot 6 | 0.333 | 13.81 (0.61) | 10.76 (0.61) | 7.70 (0.61) | 4.65 (0.61) | 1.60 (0.61) |
| Lot 11 | 0.321 | 12.79 (0.57) | 9.96 (0.57) | 7.14 (0.57) | 4.31 (0.57) | 1.48 (0.57) |
| Lot 12 | 0.241 | 10.30 (0.46) | 8.02 (0.46) | 5.74 (0.46) | 3.47 (0.46) | 1.19 (0.46) |
| Lot 13 | 0.198 | 8.54 (0.38) | 6.65 (0.38) | 4.76 (0.38) | 2.88 (0.38) | 0.99 (0.38) |

Wt.: Weight

Ext.: Extraction

Measured parts show the sediment formation.

Bx ( ): By weight of tea solid portion

TABLE 14

| Jasmine Tea Lot Nos. | Acidic Ext. Strictinin/Wt. % | Strictinin Amount (ppm) in Formulations (Ratio of Strictinin Solid Portion in Tea Solid Portion) | | | | |
|---|---|---|---|---|---|---|
| | | Bx 0.30 (0.23) | Bx 0.25 (0.18) | Bx 0.20 (0.13) | Bx 0.15 (0.08) | Bx 0.10 (0.03) |
| Lot 1 | 1.049 | 26.04 (1.19) | 20.99 (1.19) | 15.03 (1.19) | 9..08 (1.19) | 3.12 (0.19) |
| Lot 2 | 0.907 | 21.52 (0.95) | 16.76 (0.95) | 12.01 (0.95) | 7.25 (0.95) | 2.49 (0.95) |
| Lot 3 | 0.769 | 18.43 (0.82) | 14.36 (0.82) | 10.28 (0.82) | 6.21 (0.82) | 2.13 (0.82) |
| Lot 7 | 0.736 | 16.46 (0.73) | 12.82 (0.73) | 9.18 (0.73) | 5.54 (0.73) | 1.91 (0.73) |
| Lot 9 | 0.732 | 15.85 (0.70) | 12.34 (0.70) | 8.84 (0.70) | 5.34 (0.70) | 1.84 (0.70) |
| Lot 8 | 0.667 | 14.86 (0.66) | 11.58 (0.66) | 8.29 (0.66) | 5.01 (0.66) | 1.72 (0.66) |
| Lot 10 | 0.613 | 14.63 (0.65) | 11.39 (0.65) | 8.16 (0.65) | 4.93 (0.65) | 1.69 (0.65) |
| Lot 6 | 0.585 | 13.81 (0.61) | 10.76 (0.61) | 7.70 (0.61) | 4.65 (0.61) | 1.60 (0.61) |
| Lot 4 | 0.578 | 13.81 (0.61) | 10.76 (0.61) | 7.71 (0.61) | 4.65 (0.61) | 1.60 (0.61) |
| Lot 5 | 0.574 | 13.18 (0.58) | 10.27 (0.58) | 7.35 (0.58) | 4.44 (0.58) | 1.53 (0.58) |
| Lot 11 | 0.508 | 12.79 (0.57) | 9.96 (0.57) | 7.14 (0.57) | 4.31 (0.57) | 1.48 (0.57) |
| Lot 12 | 0.444 | 10.30 (0.46) | 8.02 (0.46) | 5.74 (0.46) | 3.47 (0.46) | 1.19 (0.46) |
| Lot 13 | 0.383 | 8.54 (0.38) | 6.65 (0.38) | 4.76 (0.38) | 2.88 (0.38) | 0.99 (0.38) |

Wt.: Weight  Meshed parts show the sediment formation.
Ext.: Extraction  Bx ( ): By weight or tea solid portion From the results, while the extracted amount of strictinin in case of Jasmine tea is also small by the hot-water extraction method adopted in the official method for the analysis of tannin, the extracted amount of strictinin is effectively increased by the acidic hot-water extraction method. Moreover, the determination by the acidic hot-water extraction method has a greater correlation with the occurrence of the secondary sediment than that by the hot-water extraction method. From the above, also in case of Jasmine tea, it is preferable to adopt the acidic hot-water extraction method about pH 4.5 or less, at about 60–100° C. and for about 5–60 minutes, or more preferably, pH 2.0–4.0, 70–100° C. and for 10–30 minutes for the determination of the strictinin content in the raw tea leaves.

From the results shown in Table 13 and FIG. 6, when the strictinin content in tea leaves, determined by the hot-water extraction method, is 0.49% or less, the secondary sediment hardly occurs. Further, when the strictinin content is 0.33% or less, the secondary sediment does not occur at all.

From the results shown in Table 14 and FIG. 7, when the strictinin content in the tea leaves, determined by the acidic extraction method, is 0.90% or less, the secondary sediment hardly occurs. Further, when the strictinin content is 0.61% or less, the secondary sediment does not occur at all.

From the results shown in Table 14, when the strictinin content in a formulation is 14 ppm or less, or more precisely, 13 ppm or less, the secondary sediment does not occur.

In view of the ratio of strictinin content in the tea solid portion, in case of Jasmine tea beverages, since the ordinary formulation concentrations (Brix) are about 0.2–0.3 (0.13–0.23 by weigh of tea solid), the occurrence of the secondary sediment can be prevented when the strictinin content to the tea solid portion in a tea extract or formulation is controlled so as to be about 0.5–1.1% or less, especially, about 0.6–0.8% or less. In other words, it is preferable to control the upper limit of the strictinin content in the tea solid portion depending on the tea solid concentration of the formulations as an indication. Thus, when the tea solid concentration (Brix) of the tea extract or formulation is 0.23, it is preferable to specify the upper limits of the strictinin content to the tea solid portion as 0.62%. In the same way, when the Brix is 0.18, the strictinin content to be 0.80%, and when the Brix is 0.13, the strictinin content to be 1.11% to the tea solid portion.

What is claimed is:

1. A method of manufacturing tea beverages comprising:
   determining the strictinin content in a tea extract or formulation and specifying the strictinin content to be at or below a predetermined level as an indicator, and
   carrying out one or more of selecting raw tea leaves, specifying the treatment conditions of before-heat-sterilization process, or formulating a beverage composition.

2. A method of manufacturing tea beverages comprising:
   determining the strictinin content in a tea extract or formulation before treating it with heat-sterilization, where the strictinin content is to be at or below a predetermined level as an indicator;
   carrying out one or more of selecting raw leaves, specifying the conditions of extraction, filtration, or formulation, or specifying the formulating materials and their ratios; and
   carrying out the heat-sterilization process for the tea extract or formulation containing a strictinin at or below the predetermined level.

3. A method of manufacturing tea beverages comprising:
   determining the strictinin content of a tea extract or formulation before treating it with heat-sterilization, where the strictinin content is to be at or below a predetermined level by treating the above-obtained tea extract or formulation as an indicator; and
   carrying out a heat-sterilization process for the tea extract or formulation containing a strictinin at or below the predetermined level.

4. The method of manufacturing tea beverages of claim 1, which, in a case of light-fermented tea, the determined strictinin content in a tea extract or formulation to be at about 14 ppm or less as an indicator.

5. The method of manufacturing tea beverages of claim 1, which in a case of light-fermented tea, the tea solid portion in the tea extract or formulation to be about 0.5–1.1% or less as an indicator.

6. The method of manufacturing tea beverages of claim 1, which in a case of non-fermented tea, the determined strictinin content in a tea extract or formulation to be at about 6 ppm or less as an indicator.

7. The method of manufacturing tea beverages of claim 1, which, in a case of non-fermented tea, the tea solid portion in the tea extract or formulation to be about 0.2–0.5% or less as an indicator.

8. A manufacturing process of light-fermented tea beverages comprising:
   an extraction process for extraction of an extract from raw tea leaves, a filtration process for filtrating the extract,
   a formulation process for adjusting a concentration of the extract and the pH, and a sterilization process for sterilizing the formulation; and
   wherein a determined strictinin content in a tea extract or formulation of before-heat-sterilization is at about 14 ppm or less, or the tea solid portion in the tea extract or formulation is about 0.5–1.1% or less, as an indicator.

9. A manufacturing process of non-fermented tea beverages comprising:
   an extraction process for extracting an extract from raw tea leaves,
   a filtration process for filtering the extract, a formulation process for adjusting a concentration of the extract and the pH, and a sterilization process for sterilizing the formulation; and
   wherein a determined strictinin content in a tea extract or formulation of before-heat-sterilization is at about 6 ppm or less, or the tea solid portion in the tea extract or formulation is about 0.2–0.5% or less, as an indicator.

10. The method of manufacturing tea beverages of claim 2 which, in a case of light-fermented tea, the determined strictinin content in a tea extract or formulation to be at about 14 ppm or less as an indicator.

11. The method of manufacturing tea beverages of claim 3, which, in a case of light-fermented tea, the determined strictinin content in a tea extract or formulation to be at about 14 ppm or less as an indicator.

12. The method of manufacturing tea beverages of claim 2, which, in a case of light-fermented tea, the tea solid portion in the tea extract or formulation to be about 0.5–1.1% or less as an indicator.

13. The method of manufacturing tea beverages of claim 3, which in a case of light-fermented tea, the tea solid portion in the tea extract or formulation to be about 0.5–1.1% or less as an indicator.

14. The method of manufacturing tea beverages of claim 2, which in a case of non-fermented tea, the determined strictinin content in a tea extract or formulation to beat about 6 ppm or less as an indicator.

15. The method of manufacturing tea beverages of claim 3, which, in a case of non-fermented tea, the determined strictinin content in a tea extract or formulation to be at about 6 ppm or less as an indicator.

16. The method of manufacturing tea beverages of claim 2, which in a case of non-fermented tea, the tea solid portion in the tea extract of formulation about 0.2–0.5 or less as an indicator.

17. The method of manufacturing tea beverages of claim 3, which, in a case of non-fermented tea, the tea solid portion in the tea extract or formulation to be about 0.2–0.5% or less as an indicator.

18. The method of manufacturing tea beverages of claim 1, wherein said step of carrying out comprises specifying the treatment conditions of before-heat-sterilization process.

* * * * *